United States Patent
Kamienski et al.

[15] 3,691,241
[45] Sept. 12, 1972

[54] PREPARATION OF POLYMERS AND TELOMERS USING COMPLEXES OF ORGANOMAGNESIUMS WITH CERTAIN HYDRIDES AS CATALYSTS

[72] Inventors: Conrad W. Kamienski; Joseph H. Merkley, both of Gastonia, N.C. 28052

[73] Assignee: Lithium Corporation of America, New York, N.Y.

[22] Filed: Aug. 24, 1970

[21] Appl. No.: 66,563

[52] U.S. Cl. ..........................260/668 B, 260/94.2 M
[51] Int. Cl. .............................................C07c 15/06
[58] Field of Search ........260/668 B, 94.2 M, 94.2 R, 260/94.7 R

[56] References Cited

UNITED STATES PATENTS

| | | | |
|---|---|---|---|
| 2,771,495 | 11/1956 | Pines et al. | 260/668 B |
| 3,451,988 | 6/1969 | Langer | 260/94.2 M |
| 3,509,067 | 4/1970 | Bostick | 260/94.2 R |
| 3,548,033 | 12/1970 | Bostick | 260/94.2 R |

FOREIGN PATENTS OR APPLICATIONS

| | | | |
|---|---|---|---|
| 736,422 | 9/1955 | Great Britain | 260/668 B |

*Primary Examiner*—Curtis R. Davis
*Attorney*—Wallenstein, Spangenberg, Hattis & Strampel

[57] ABSTRACT

Preparation of polymers of conjugated dienes, such as those of 1,3-butadiene; and of telomers, such as those of benzene or toluene with 1,3-butadiene; utilizing, as a catalyst, complexes of organomagnesiums with (i) alkali metal hydrides or (ii) tetraalkylammonium hydrides, as, for example, complexes of di-sec-butyl-magnesiums with potassium hydride or tetramethylammonium chloride.

9 Claims, No Drawings

PREPARATION OF POLYMERS AND TELOMERS USING COMPLEXES OF ORGANOMAGNESIUMS WITH CERTAIN HYDRIDES AS CATALYSTS

This invention relates to the production of polymers of conjugated dienes and of telomers in which there is utilized, as a catalyst, complexes of organomagnesiums with alkali metal hydrides or with tetraalkylammonium hydrides.

The complexes utilized in the practice of the present invention are disclosed in the application of Eugene C. Ashby, Ser. No. 9,998, filed Feb. 9, 1970, now U. S. Pat. No. 3,655,790. As there disclosed, various said complexes can be represented by the formula $M_nMgR^1R^2H_n$ where M is sodium, potassium, lithium or cesium, $R^1$ and $R^2$ are the same or different $C_2$—$C_{15}$ alkyl (1°, 2° or 3°), carbocyclic aryl or carbocyclic aralkyl, or cycloalkyl; and $n$ is ½, 1, 2 or 3, illustrative examples of said complexes being the following, where M is as indicated above, particularly sodium or potassium.

M Mg(s-Bu)$_2$H
M$_2$Mg(s-Bu)$_2$H$_2$
M$_2$Mg(s-Bu·n-Bu)H$_2$
M$_3$Mg(s-Bu)$_3$H$_2$
M Mg(n-Amyl)$_2$H
M$_2$Mg(n-Amyl)$_2$H$_2$
M Mg $\phi_2$H
M$_2$Mg $\phi_2$ H$_2$
M$_2$Mg($\phi$·s-Bu)H$_2$
M Mg(Tolyl)$_2$H
M$_2$Mg(Tolyl)$_2$H$_2$
M Mg $\phi_2$ H·Mg $\phi_2$
M Mg(s-Bu)$_2$H·Mg(s-Bu)$_2$ Formulas representing the complexes used in the practice of the present invention can be written in a number of different ways. Thus, for instance, in the case of the complex KMg $\phi_2$ H·Mg $\phi_2$, the same complex also can be expressed by either of the following formulas: $(KH)_{1/2}Mg \phi_2$ and KH·(Mg $\phi_2$)$_2$.

Among said organomagnesiums which can be utilized to form the complexes employed in the practice of the present invention are di-n-propylmagnesium, diisopropylmagnesium, isopropyl-isobutyl magnesium, di-n-butylmagnesium, di-s-butylmagnesium, s-butyl-n-amyl magnesium, di-n-amylmagnesium, diisoamylmagnesium, dihexylmagnesiums, diheptylmagnesiums, dioctylmagnesiums, dinonylmagnesiums, s-butylisooctyl magnesium, didecylmagnesiums, didodecylmagnesiums, ditridecylmagnesiums, dietetradecylmagnesium, dipentadecylmagnesium, dicyclohexylmagnesium, dicyclooctylmagnesium, diphenylmagnesium, di-p-tolylmagnesium, di-p-anisylmagnesium, dibenzylmagnesiums and dixylylmagnesiums. While, as indicated, in the case of the complexes of the dialkylmagnesiums, the alkyl radicals may contain as low as two carbon atoms, the use of such complexes is far less desirable than the use of those in which the alkyl radicals contain at least four carbon atoms. Accordingly, in producing the conjugated diene polymers and the telomers pursuant to the present invention, it is especially advantageous to use complexes of the dialkyl-magnesiums with the alkali metal hydrides in which each of the alkyl radicals contains from four to 15 carbon atoms, and especially useful are those in which the alkyl radicals contain from four to five carbon atoms, notably those in which the dialkylmagnesium is di-s-butyl-magnesium.

Of the alkali metal hydrides with which the organomagnesiums are reacted to produce the complexes used pursuant to the present invention, sodium hydride and potassium hydride are especially useful. However, lithium hydride and cesium hydride can also be employed. The complexes which are made from lithium hydride, generally speaking, are not as stable as those of said other alkali metals. Furthermore, as pointed out above, the complexes can also be utilized in the form of their tetraalkylammonium derivatives, that is, where the alkali metal of the alkali metal hydride present in the complex is replaced by tetraalkylammonium. Thus, for instance, the complex KMg(s-Bu)$_2$H dissolved in a liquid hydrocarbon such as cyclohexane, benzene or toluene is admixed with an equivalent amount of a tetraalkylammonium halide, such as tetramethylammonium chloride, tetraethylammonium chloride, dodecyltrimethylammonium chloride, or the corresponding bromides. Potassium chloride or potassium bromide, as the case may be, precipitates out, leaving, in solution, the complex in which tetraalkylammonium has replaced the potassium. Said complexes are useful for the production of conjugated diene polymers and of telomers in accordance with the present invention.

The complexes are desirably prepared by reacting the organomagnesium with the alkali metal hydride in an inert liquid medium, particularly a liquid hydrocarbon, at a temperature in the range of about 0° to 150° C, preferably, in most cases, in the range of about 25° to 100° C.

The reaction media in which the aforesaid complexes are most desirably prepared are liquid hydrocarbons, which may be of aliphatic, cycloaliphatic or aromatic character, illustrative examples of which are n-pentane, n-hexane, n-heptane, octane, cyclohexane, cyclooctane, benzene, toluene, ethylbenzene, xylenes, and mixtures of any two or more thereof. Non-aromatic tertiary monoamines and tertiary polyamines can also be used, illustrative examples of which are triethylamine, triisopropylamine, triiso-butylamine, N-methylpiperidine, N,N'-dimethylpiperazine, N,N'-tetramethylethylenediamine and triethylenediamine. Generally speaking, ethers should be avoided since, as has been pointed out above, they cause cleavage of the complexes and, thus, they do not permit the formation and isolation or recovery of the complexes. However, in isolated instances, ethers can be used, as in the production of a complex of diphenylmagnesium with potassium hydride in a diethyl ether reaction medium at room temperature.

As disclosed in the aforementioned patent application of Eugene C. Ashby, illustrative examples of the preparation of the complexes are as follows:

EXAMPLE 1

Di-s-butylmagnesium (s-Bu$_2$Mg) is stirred with an equivalent amount of potassium hydride in a cyclohexane reaction medium, at a temperature of 30° C for several hours until the potassium hydride dissolves. Analysis of the solution shows a K:Mg:H ratio of 1.01:1.00:1.02. Removal of the solvent under vacuo results in leaving a light yellow oil (comprising a complex corresponding to the formula KMg(s-Bu)$_2$H).

It has been observed that, when either excess potassium hydride is stirred with KMg(s-Bu)$_2$H, or when 2 equivalents of potassium hydride are stirred with 1 equivalent of di-s-butyl-magnesium, precipitation of the magnesium-containing species occurs.

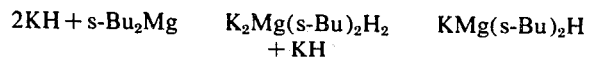

$2KH + s\text{-}Bu_2Mg \quad K_2Mg(s\text{-}Bu)_2H_2 \quad KMg(s\text{-}Bu)_2H + KH$ Thus, it appears that the soluble complex is a 1:1 adduct. The 2:1 complex is isolated as a light green powder which darkens if exposed in a dry box for extended periods of time. This powder is highly flammable in air.

EXAMPLE 2

2 equivalents of s-$Bu_2Mg$ and 1 equivalent of sodium hydride are reacted in cyclohexane at a temperature of 40° C for about 2 days to produce a complex corresponding to the formula $NaMg(s\text{-}Bu)_2H\cdot s\text{-}Bu_2Mg$.

EXAMPLE 3

One equivalent of potassium hydride is reacted with a slight excess over 2 equivalents of diphenylmagnesium in a diethyl ether medium at a temperature of 30° C until a complex forms in the form of an insoluble solid which, on analysis, is shown to correspond to the formula $KH\cdot 2Mg\ \phi_2$. The excess diphenylmagnesium remains in solution. In this particular case, it appears that the complex forms and precipitates out before cleavage occurs by the diethyl ether.

EXAMPLE 4

One equivalent of potassium hydride is reacted with 1 equivalent of dicyclohexylmagnesium in a cyclohexane medium at a temperature of 40° C until the complex is formed.

EXAMPLE 5

One equivalent of cesium hydride is reacted with 1 equivalent of di-s-butylmagnesium in a toluene medium at 30° C until the complex is formed.

In polymerization reactions carried out in accordance with the present invention, the polymers which can be produced are homopolymers as well as copolymers. The monomers, which most desirably contain from four to 12 carbon atoms, that can be employed are conjugated dienes and vinyl-substituted aromatic compounds which, conveniently, are generically referred to herein as monomers. They include, by way of illustration, butadienes such as 1,3-butadiene; isoprene; piperylene; styrene; α-methylstyrene; 1,4-divinyl-benzene; 1-vinylnaphthalene and 2-vinylnaphthalene. Numerous others are well known to the prior art and are shown, for instance, in U.S. Pat. Nos. 3,091,606 and 3,377,404, the disclosures of which, in relation to conjugated dienes and vinyl-substituted aromatic compounds, are hereby incorporated by reference. Monoolefins can also be effectively polymerized with the catalyst systems of the present invention. Such monoolefin monomers include, for instance, ethylene, propylene, 1-butene, 2-butene, isobutene and higher molecular weight monoolefins.

With regard to the telomerization reactions which are carried out in accordance wit the present invention, the telogens which are used are aromatic compounds, especially aromatic hydrocarbon compounds containing at least one hydrogen capable of being replaced by a metal atom but devoid of any other substituents as, for instance, hydroxyl, chlorine, bromine, iodine, carboxyl, and nitro, which substituents are reactive with the catalyst systems of the present invention. Illustrative examples of such telogens are benzene, $C_1$—$C_4$ mono-, di- and trialkyl benzenes exemplified by toluene, ethylbenzene, n-propylbenzene, isopropylbenzene; o, m- and p-xylenes; 1,3,5-trimethylbenzene; n-, sec- and tert-butylbenzenes; cyclohexylbenzene; alkyl, notably $C_1$—$C_4$, and cycloalkyl substituted polycyclic aromatic compounds exemplified by 1,2,3,4-tetrahydronaphthalene, 1-methylnaphthalene, 1-isopropyl-naphthalene, 1,3-isobutylnaphthalene, and 1-cyclohexylnaphthalene; alkoxy-aromatic compounds exemplified by anisole; 1,3-dimethoxy-benzene; monopropoxybenzene; 1-methoxynaphthalene and 1,3-dimethoxynaphthalene; dialkylamino-aromatic compounds, notably those in which the alkyl is $C_1$—$C_4$, exemplified by dimethylaminobenzene; 1,3-bis-(diisopropylaminobenzene) and 1-dimethylaminonaphthalene. Especially satisfactory is toluene.

The taxogens which are reacted with the telogen to produce telomers in accordance with the present invention are advantageously monomeric conjugated dienes, vinyl-substituted aromatic compounds, and monoolefins, illustrative examples of which have been set forth above, in U.S. Pat. Nos. 3,091,606 and 3,377,404, and of which 1,3-butadiene is especially satisfactory as the monomeric conjugated diene, styrene and α-methylstyrene as the vinyl-substituted aromatic compounds, and ethylene and propylene as the monoolefins.

In those instances in which Lewis base aliphatic tertiary amines are utilized in the reaction medium in which telomers made pursuant to the present invention are produced, as shown in Example II below, illustrative examples of such tertiary amines are 2-dimethylaminoethylmethyl ether [$(CH_3)_2$—N—$CH_2$—$CH_2$—O—$CH_3$]; 2-diethyl-aminoethylmethyl ether [$(C_2H_5)_2$—N—$CH_2$—$CH_2O$—$CH_3$]; 2-dimethylaminopropylmethyl ether [$(CH_3)_2$—N—$CH_2$—$CH_2$—$CH_2$—O—$CH_3$]; trimethylamine, triisopropylamine and tributylamine; and ditertiary amines such as N,N,N',N'-tetramethylenediamine. Other suitable Lewis base tertiary amines which can be utilized are disclosed in U.S. Pat. Nos. 3,206,519 and 3,451,988 which, for this showing, are herewith incorporated by reference. Especially suitable, where such are used, are N,N,N',N'-tetramethylethylenediamine (TMEDA) and 1-Dimethylamino-2-ethoxyethane (2-dimethylaminoethyl ethyl ether).

The following examples are illustrative of the preparation of polymers and telomers in accordance with the present invention.

EXAMPLE I

PREPARATION OF A 1,3-BUTADIENE TELOMER USING POTASSIUM HYDRIDE DI-SEC-BUTYLMAGNESIUM AS A CATALYST

To 400 ml of toluene are added 0.034 moles of potassium di-sec-butylmagnesium hydride [$KMg(s$—$C_4H_9)_2H$ and 5 ml of N,N,N',N'- tetramethylethylenediamine. The solution is yellowish red in color which deepens to a dark red as the reaction progresses. 1,3-butadiene is then fed as a gas at 3.4 liters/min. The temperature rises immediately from 25° to 60° and is maintained at 65°-70° with external cooling. After 3 hours, 2 ml of water are added to deactivate the catalyst. The toluene is removed under reduced pressure to yield 1.8 kg (117 lbs/mole of catalyst) of a viscous clear dark oil with a molecular weight (VPO) of 3081 and a molecular weight distribution of 2.32. The microstructure of the oil consists of 38 percent 1,2-linkages and 60 percent 1,4 linkages (cis & trans).

EXAMPLE II

PREPARATION OF 1,3-BUTADIENE POLYMER USING, AS A CATALYST, A 1:1 COMPLEX OF DI-SEC-BUTYLMAGNESIUM AND POTASSIUM HYDRIDE

To 1 l of hexane was added 0.0504 moles of potassium di-sec-butylmagnesium hydride and 0.04 moles of N,N,N',N-tetramethyl-ethylenediamine.1,3-butadiene was initially fed as a gas at 3.4 1/min; however, after approximately 5 minutes, the feed rate was reduced to 1.7 1/min due to heavy reflux. The temperature rose immediately from room temperature to 60°, but was maintained afterwards at 40° with external cooling. After 40 minutes, the reaction was terminated with water. Removal of hexane under reduced pressure yielded 235 g of an extremely viscous polymer whose molecular weight was 2100. The microstructure of the polymer was cis = 0, trans 33.58 percent, vinyl 66.42 percent.

What is claimed is:

1. In a method of preparing telomers in which the telomers are prepared, in the presence of a catalyst, by a reaction between a telogen in the form of an aromatic compound containing at least one active hydrogen capable of being replaced by a metal atom but devoid of any other substituents which are reactive with the organometallic compounds defined hereafter, with at least one taxogen in the form of a monomer selected from the group consisting of conjugated dienes, vinyl-substituted aromatic compounds, and mono-olefins, the improvement which consists in the utilization, as the catalyst, of a complex of a tetraalkylammonium hydride or of an alkali metal hydride in which the alkali metal is selected from the group of sodium, potassium, lithium and cesium, with an organo-magnesium selected from the group of $C_2$—$C_{15}$ dialkymagnesiums, dicycloalkylmagnesiums and carbocyclic diarylmagnesiums.

2. The method of claim 1, in which said complex corresponds to the formula $M_nMgR^1R^2H_n$ where M is an alkali metal selected from the group of sodium, potassium, lithium and cesium, $R^1$ and $R^2$ are the same or different $C_4$—$C_{15}$ alkyl, cycloalkyl, carbocyclic aryl and carbocyclic aralkyl, and $n$ is 1, 2 and 3.

3. The method of claim 2, in which M is potassium, $R^1$ and $R^2$ are each $C_4$—$C_5$ alkyl, and $n$ is 1 or 2.

4. The method of claim 3, in which $R^1$ and $R^2$ are each s-butyl.

5. The method of claim 4, in which the complex corresponds to the formula $KMg(s-Bu)_2H$.

6. The method of claim 1, in which the complex corresponds to the formula $NaMg(s-Bu)_2H \cdot s-Bu_2Mg$.

7. The method of claim 1, in which said catalyst is a complex corresponding to the formula $M_nMgR^1R^2H_n$ where M is tetraalkylammonium, $R^1$ and $R^2$ are the same or different $C_4$—$C_5$ alkyl, and $n$ is 1, 2 or 3.

8. The method of claim 1, in which the telogen is toluene and the taxogen is 1,3-butadiene.

9 The method of claim 4, in which the telogen is toluene and the taxogen is 1,3-butadiene.

* * * * *

UNITED STATES PATENT OFFICE
CERTIFICATE OF CORRECTION

Patent No. 3,691,241          Dated September 12, 1972

Inventor(s) Conrad W. Kamienski, et. al.

It is certified that error appears in the above-identified patent and that said Letters Patent are hereby corrected as shown below:

On the cover sheet in the title and column 1, line 1, cancel "POLYMERS AND".

Signed and sealed this 1st day of May 1973.

(SEAL)
Attest:

EDWARD M. FLETCHER, JR.          ROBERT GOTTSCHALK
Attesting Officer                Commissioner of Patents